United States Patent [19]

Kellison

[11] Patent Number: 4,642,964
[45] Date of Patent: Feb. 17, 1987

[54] GROUT IN PLACE FASTENER SYSTEM

[76] Inventor: Roger C. Kellison, 8200 Blvd. East, North Bergen, N.J. 07047

[21] Appl. No.: 655,508

[22] Filed: Sep. 27, 1984

[51] Int. Cl.⁴ ............................ E04B 1/38; E04C 5/00
[52] U.S. Cl. ........................................ 52/699; 52/705
[58] Field of Search .................. 52/698, 699, 704, 705

[56] References Cited

U.S. PATENT DOCUMENTS

| | | | |
|---|---|---|---|
| 1,090,545 | 3/1914 | Kneas | 52/699 X |
| 1,108,859 | 8/1914 | Bennett | 52/699 X |
| 1,264,189 | 4/1918 | Keator | 52/699 X |
| 1,286,658 | 12/1918 | Lamet | 52/699 |
| 1,365,718 | 1/1921 | Ogden | 52/705 X |
| 1,670,443 | 5/1928 | Fishel | 52/699 |
| 1,798,468 | 3/1931 | Hartzler et al. | 52/698 |
| 1,940,545 | 12/1933 | Holmes | 52/699 |
| 2,560,951 | 7/1951 | Henderson et al. | 52/705 |
| 2,934,480 | 4/1960 | Slomin | 204/37.1 |
| 3,377,807 | 4/1968 | Nave | 52/698 X |
| 3,532,316 | 10/1970 | Mathes | 248/205.3 |
| 3,605,366 | 9/1971 | Zakim | 52/698 X |
| 4,129,007 | 12/1978 | Rausch | 52/698 X |
| 4,211,049 | 7/1980 | Fischer | 52/704 |
| 4,214,416 | 7/1980 | Fischer | 52/704 |
| 4,278,363 | 7/1981 | Choi | 405/260 |
| 4,303,354 | 12/1981 | McDowell, Jr. | 405/261 |
| 4,395,859 | 8/1983 | Rohrer | 52/705 |

FOREIGN PATENT DOCUMENTS

| | | | |
|---|---|---|---|
| 917310 | 1/1947 | France | 52/705 |
| 2062794 | 2/1981 | United Kingdom . | |
| 601425 | 4/1978 | U.S.S.R. . | |
| 613119 | 6/1978 | U.S.S.R. . | |
| 783478 | 11/1980 | U.S.S.R. . | |
| 857495 | 9/1981 | U.S.S.R. . | |

OTHER PUBLICATIONS

Nyltite advertising literature, reference A-1, undated.
Rawl Masonry Anchors, B-1, Quick Reference Catalog No. 78, undated.
Reference C-1, Pro-Set Taper Bolt, Concrete Anchor advertising literature, U.S. Expansion Bolt Company, undated.
Reference D-1, Kelken-Gold advertising literature for: Kelistud Timber Anchor, Kelibolt Headed Anchor, Kelistud Highway Anchor, Kelieye Eye Bolt Anchor, Keligroutin Resin Bond Anchor, and Kelicastin Foundation Anchor, undated.

Primary Examiner—Stuart S. Levy
Assistant Examiner—Joseph J. Hail, III
Attorney, Agent, or Firm—Brumbaugh, Graves, Donohue & Raymond

[57] ABSTRACT

Fastener systems for securing an object to the surface of structure, and methods for forming the same. Shafts of fasteners have threaded ends which are to be embedded in holes formed in the structure and which are filled with a securing agent. For greater pull-out resistance the holes can be enlarged at their internal ends, either by molding or by breaking out the walls of the hole ends with a special tool. A lubricant coating the inserted shaft end permits withdrawal of the fastener shafts. In one embodiment, the external end and the internal end of the shaft are reversely threaded. A cap nut on the external end has a compressible pellet therein. Initial threading downward of the cap nut tightens the nut more securely against the secured object, and further turning unthreads the fastener. A fixed head embodiment carries a cap at its internal end to prevent hardening securing agent from filling in under the shaft so that the shaft can be threaded deeper into the hole when the securing agent hardens.

17 Claims, 13 Drawing Figures

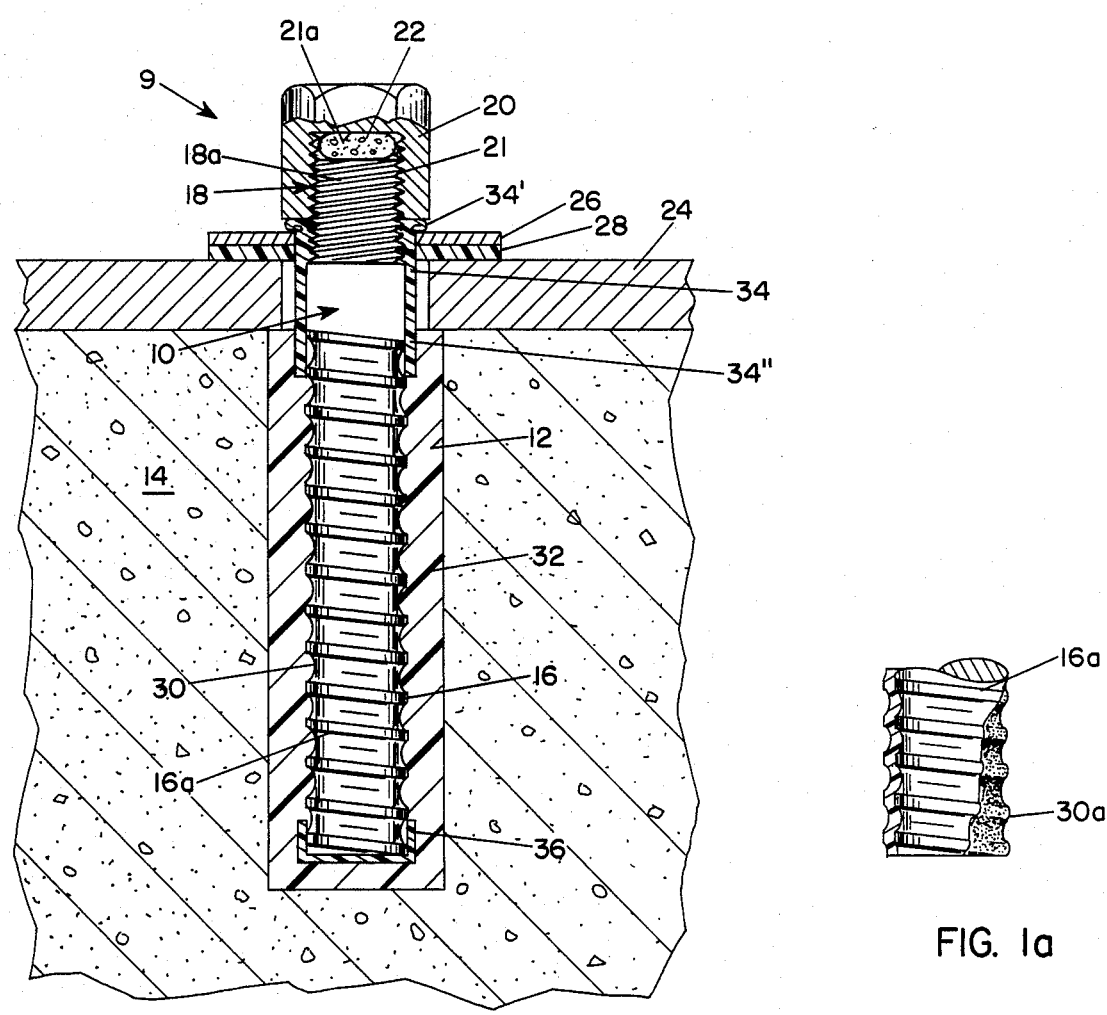
FIG. 1
FIG. 1a
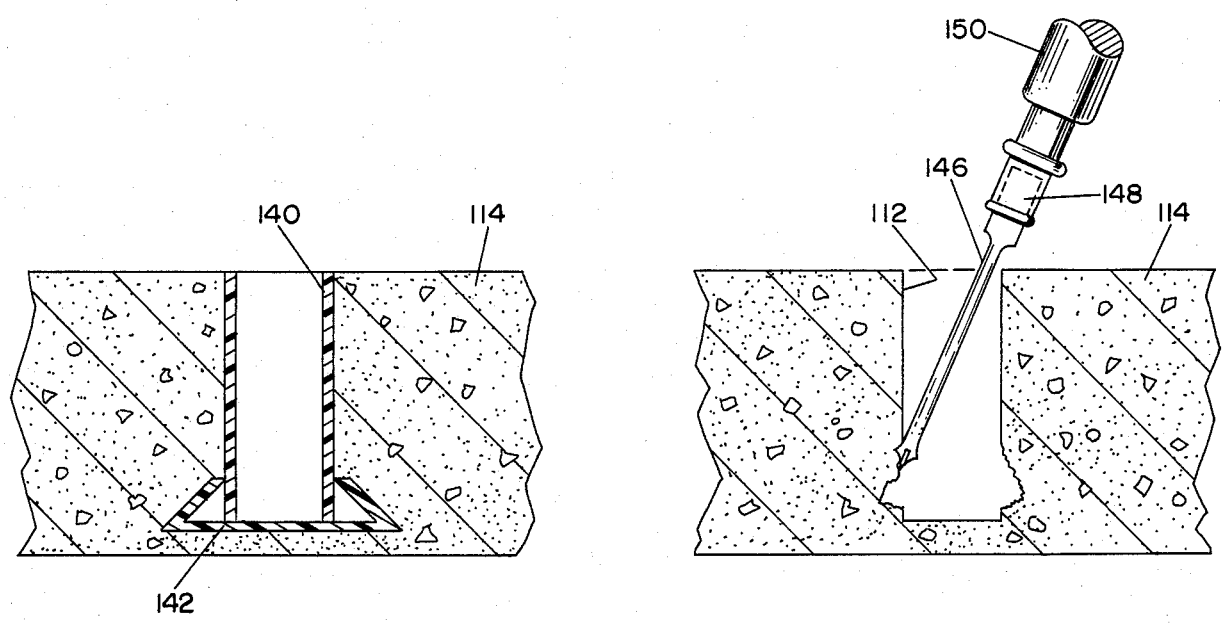
FIG. 2
FIG. 3

GROUT IN PLACE FASTENER SYSTEM

BACKGROUND OF THE INVENTION

This invention relates to fasteners of the kind used to attach an item to, for example, a concrete surface, and in particular to fasteners that have a threaded member about which a high strength bonding agent is poured to form an anchor molded in situ.

In the past, relatively heavy items, such as permanent concrete barriers for dividing highway lanes, or rails for railroads held to concrete ties, were held in place by bolts or fasteners embedded in the concrete surface. However, because no provisions had been made for facilitating the simple and quick removal of such bolts or fasteners, it was often necessary to cut or burn off the bolt or fastener when it was necessary or desirable to remove or replace the barrier or rail.

In the applicant's previous U.S. application Ser. No. 521,111, filed Aug. 8, 1983 now abandoned, and entitled Anchor and Bolt, Method of Making, and Method of Securing by Same, fasteners are described that allow their removal from the hole in which they are embedded. These fasteners include a threaded shaft for location in a hole formed in the concrete or other surface, a head or other fastening part for securing the member to be affixed to the threaded shaft, and a two part grout or securing mixture that hardens in the hole about the threaded shaft to mold female threads engaging the male threads of the shaft. The threaded shaft may be coated with a release agent permitting the fastener to be backed out of the hole at some later time.

SUMMARY OF THE INVENTION

It is an object of the present invention to overcome the above-described shortcomings of the known fasteners such as had to be burned off for removal, while providing several improvements in fastener systems and methods using a hardening agent that forms, in situ, an anchor reliably securing a threaded shaft. Unlike the fastener of the above-mentioned patent application, further tightening of a fixed head fastener system is possible after the securing agent has cured. Removal by continued turning of an external nut in its tightening direction occurs in one form of the system. Several means of providing a stronger formed in situ anchor are described. Water and corrosion resistance are provided and insulation keeps one fastener from contacting the hole interior.

A first embodiment of the present invention includes a shaft that has a first end threaded in one direction, which is to be embedded in the hole, and a second end threaded in the other direction for receiving, e.g., a cap nut and washers, to hold the object to be secured. Like the fastener of applicant's earlier application, the lower part of the shaft is disposed in the hole in a concrete railroad tie, a road, cast concrete structure or other surface, and is secured in place by a hardening securing agent or grout. The grout contemplated is the same as that in applicant's earlier application, i.e., a two-part cement consisting of a viscous, liquid, peroxide-cured resinous material and a peroxide agent formed as a flowable powder, easily measured to the appropriate predetermined amount. A release agent may be used to coat the cut or rolled thread end of the shaft that is to be inserted in the hole.

In use, the threaded shaft end to be inserted is dipped in the release agent. The cement and powdered curing agent are mixed together outside the hole. The thus formed securing agent is poured into the hole. The shaft is then inserted through the secured object and into the hole. The securing agent hardens about the threads, forming in situ female threads that conform to the coated threads. Once the securing agent hardens, the cap nut can be tightened down on the rolled-thread shaft end to secure the object to the underlying surface. The nut is tightened until a collapsible pellet therein, e.g., a neoprene pellet, collapses to a predetermined thickness, greatly resisting further tightening by hand, and giving the fully-tightened feel so that it is apparent to the workman that further tightening is unnecessary. To remove the fastener from the hole, continued, very strenuous turning of the nut in the same tightening direction will entirely collapse the pellet, bind the nut and the shaft, and cause the shaft to back out of the hole, due to the opposite handedness of the threads on the two ends of the shaft.

The fastener assembly may further include a sleeve of nylon or the like inserted through washers and into the hole in the underlying surface to join the hardening grout. The sleeve has a deformable collar which upon tightening down of the nut, will compress into the washer hole to effect a water tight seal. The sleeve's protrusion downward into the hardened securing agent completes the water tight enclosure of the shaft to largely eliminate corrosion. A die cut polyurethane washer can be used in addition to a stainless steel (or other suitable metal) washer. This also will compress to contribute further to the water tight seal.

Insulating means on the embedded end of the shaft, in one embodiment, is a polyethylene end cap press fit to the shaft end. This prevents the lower extremity of the inserted shaft end from engaging a wall of the hole when the shaft is inserted at an angle to the axis of the hole. Of course, in the case of a short hole, this also prevents the metal shaft resting directly on the hole bottom. Electrical conduction from the fastener to ground is prevented and the end cap serves as a further moisture barrier. Rather than using an end cap as the insulating means, the cut thread end of the elongate member may instead be dipped into a plastic-based or vinyl-based dip. Teflon may be added to the dip to enable the coating thus formed to serve as the release agent as well as the insulation means. Backing out the shaft unthreads the shaft from the coating.

One end cap at the lower end of the shaft is a cup dimensioned so as to provide a void below the bottom of the shaft. This is advantageous where the shaft has a fixed head to form a bolt. The bolt may be screwed down farther into the hole once the securing agent has hardened by virtue of the void formed below it. A collapsible pellet, similar to that described above, may be located in this void. The shaft can then be inserted into the hole until the cup strikes the bottom of the hole, which assists a worker in the field in properly positioning the elongate member. The pellet prevents the cup from collapsing, when the shaft is first inserted, but will collapse if the shaft is threaded further down into the hole after the securing agent has set.

Enlarging the diameter of the bottom of the hole in which the shaft is embedded has proven to increase greatly the holding strength. In the case of an already drilled hole, a special drill, or chisel bit having a carbide or otherwise hardened tip is secured to a conventional drill having a hammer mode. The drill bit is of a length slightly longer than the depth of the hole and is narrow compared to the hole. By virtue of its narrowness the drill bit can be inserted into the hole diagonally, to bring its tip into engagement with the hole side walls at the bottom of the hole to break out the side walls and enlarge the diameter.

Alternatively, the broadened hole can be formed initially by various mold parts at the time of casting that which forms the surface in which the fastener shaft is to be embedded. A long, hole-forming rod or tube part bears at its end a hollow frusto-conical foot, which may be, e.g., polyethylene. Together these are cast in place, for example, in a concrete railroad tie, fresh concrete construction, or the like. The long mold part should have a releasable surface such as a smooth Teflon surface or a threaded surface coated with a release agent, so that once the cast concrete has hardened, the long mold part can be removed, leaving behind the foot which has formed the desired undercut in the hole, and which may serve as well as the insulating means for the fastener shaft when it is inserted into the hole. The mold part may be one of a number of such parts secured on a support to form a number of holes corresponding to the locations of holes in the object which is to be secured.

Finally, one embodiment of the fastening systems of this invention includes a separable two-part shaft, the lower portion of which is threaded on the outside surface, but uncoated. An upper coated shaft part terminates in a threaded end of smaller diameter which threads into a threaded bore at the upper end of the lower part. The lower part is grouted in place and the upper end unscrews and slips out of the grout filled hole leaving behind the lower end when removal is required.

BRIEF DESCRIPTION OF THE DRAWINGS

For a better understanding of the present invention, the scope of which will be pointed out in the appended claims, reference is made to the following detailed description of exemplary embodiments thereof, taken in conjunction with the accompanying drawings, in which:

FIG. 1 is a fragmentary cross-sectional view of a removable, water proofed, and insulated fastener in accordance with a first embodiment of the present invention;

FIG. 1a is a fragmentary elevation of a portion of a shaft of a fastener like that of FIG. 1 having an insulating coating thereon;

FIGS. 2 and 3 are fragmentary cross-sectional views and illustrate apparatus and methods for providing an enlarged diameter at the bottom of the holes in which fasteners of the present invention are inserted;

DESCRIPTION OF EMBODIMENTS

Figure 4A:
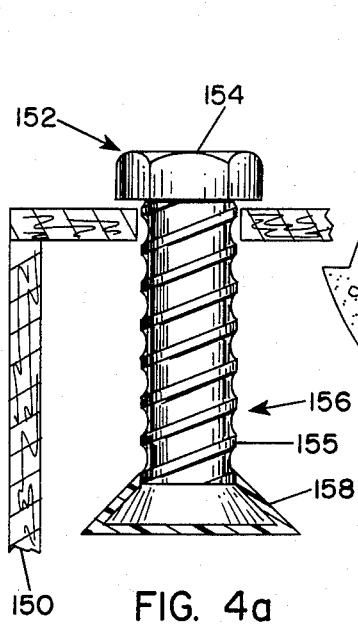
FIGS. 4a–4e are fragmentary cross-sectional views of the steps of a method of using a fastener system, and show an alternative embodiment of a fastener in accordance with the present invention.

With reference first to FIG. 1, a fastener system 9 secures an object 24 such as a railroad rail fastener (known as a "direct fixation" or "D.F." fastener) to concrete structure 14 such as a cast concrete railroad tie. The fastener system includes a shaft 10 having a first end 16 provided with left-hand cut threads 16a. A second end 18 of the shaft has right-hand rolled threads 18a, and forms an external portion of the fastener that receives a nut 20. The nut 20 is a cap nut having a blind hole 21 terminating at an interior end surface 21a. A collapsible pellet 22, made, for example, of neoprene, is interposed between the top of the shaft end 18 and the nut interior end surface 21a. This fastener system also includes a metal washer 26 and a die-cut washer 28 (which may be e.g., polyurethane), both of which are interposed between the nut 20 and the D.F. rail fastener 24. A sleeve 34 has a deformable head or collar 34' adjacent to the nut 20 and a cylindrical body 34" that extends down far enough into a hole 12 to embed in a hardening securing agent 32 filling the hole. Deformable headed sleeves suitable for this use are available under the trademark Nyltite. The fastener system also includes a polyethylene end cap 36 which serves to electrically insulate the shaft 10 from the hole interior if the shaft is inserted at an angle from the vertical that would ordinarily bring the end of the shaft into contact with the side of the hole or if the hole is short enough to bring the bottom of the shaft 11 into contact with the hole bottom. In this event, the end cap also serves as a moisture barrier between the shaft and the hole wall.

The hole 12 may be one of a number of holes in the concrete railroad tie 14 or other concrete structure. The holes can be drilled at the site, using the D.F. fastener 24 as a template. Alternatively, the holes can be provided in the tie 14 at the time of its manufacture. The securing agent 32 contemplated is a two-part cement consisting of a viscous, liquid, peroxide-cured resinous material and a peroxide curing agent formed as a flowable powder, easily measured to the appropriate predetermined amount to permit simplified mixing in the field of the correct proportions of the curing agent and the liquid hardenable resinous cement. Suitable two-part resinous cements commercially available are "Mastico Adhesive" from A&P Foglia, 14 Hickory Dr., East Brunswick, N.J. and "Kelibond" from Kelken-Gold Inc., P.O. Box 336T, Hazlet, N.J.

A release agent 30, not apparent in FIG. 1, coats the threads 16a of the lower end of the shaft 10. The release agent 30 may include any of a wide range of commercially available waxes or greases. Preferably, the release agent 30 includes Teflon dispersed throughout any suitable grease or grease-like lubricant that is of suitable consistency to coat the cut threads 16a.

In use in the field, the first end 16 of the shaft 10 is dipped into the release agent 30 to coat the threads 16a. The cement and powdered curing agent are stirred together in the correct proportions, and poured into the hole 12. The first end 16 and the sleeve 34 are then inserted through the washers and the D.F. fastener 24 into the hole 12 filled with the securing agent 32 and the securing agent hardens. By hardening about the cut threads 16a of the first end 16, the securing agent 32 forms female threads conforming to the cut threads 16a of the first end 16. The sleeve 34 and the hardened agent 32 keep surface water and moisture from reaching the threaded member. The nut 20 is hand-wrench tightened, causing the collapsible pellet 22 to collapse to a predetermined thickness, and the collar 34' of the nylon sleeve 34 to deform and flow tightly around the shaft and into the washer hole, effecting a water tight seal at that location. The die cut washer also compresses by about 50%, further enhancing the water tight seal. Because it is thus made water tight, the fastener system is highly resistant to corrosion. Resistance of the pellet 22 to further collapse gives the workman sufficient resistance to further tightening to cause him to cease turning down the nut.

If the shaft 10 must be removed from the hole 12, the nut 20 need simply be turned, albeit with considerably more force, in the same direction as caused the tightening of the nut 20. A standard rotation impact wrench may be used to this end. This further turning causes the cap nut 20, the pellet 22, and the upper end 18 of the threaded member to bind together. The left-hand cut threads 16a unscrew from the hardened securing agent 32 owing to the release properties of the release agent 30.

As shown in FIG. 1a, instead of coating the cut threads 16a with a release agent 30 and providing a separate polyethylene insulating end cap 36, the present invention also contemplates dipping the cut threaded shaft end 16 in an insulating plastic or vinyl based dip, such as is used to coat the handles of pliers, wire cutters, etc. One such product is commercially available under the trade name Plasti-Dip. To the commercially available dip is added Teflon to impart the same release properties as described above, while at the same time providing an insulating covering 30a. In this case, when the elongate threaded member 10 is removed, the covering 30a remains.

Enlarging the diameter of the bottom of a hole in which the fastener shaft is to be embedded greatly increases the holding strength of the resin-bonded fasteners of the present invention. The enlarged diameter areas may be formed at the time concrete is cast or, alternatively, may be opened up in an already drilled hole. FIG. 2 illustrates a method of forming such enlarged holes when casting the structure that forms the surface to which an object is to be secured. A concrete railroad tie 114 has cast in place therein elongate mold parts 140 (one of which is shown). In this case, the part 140 is a Teflon sleeve of a predetermined diameter, which is inserted into a frusto-conically shaped hollow cup or foot 142 of, for example, polyethylene. The mold parts 140 may be of another material that will enable them to be released from the hardened concrete or they too can be coated with a suitable release agent. The diameter of the parts 140 should be slightly greater than the diameter of the fastener shaft later to be inserted. Concrete is poured into a mold and around the parts 140. Once the cast concrete has hardened, the parts 140 are removed from the tie 114, leaving the polyethylene feet 142 behind. The result is a cast tie having preformed holes with enlarged diameters at their base. A fastener shaft, such as that illustrated in FIG. 1, may thereafter be inserted into the hole along with the securing agent, as has been described above.

Instead of molding holes in new cast structure according to the foregoing method illustrated in FIG. 2, the base of an already existing or freshly drilled hole may be enlarged, as illustrated in FIG. 3, by a long, narrow, bit 146 with a carbide tip 147 using a conventional drill 150 having a hammer mode. Angled into the hole and worked around the bottom of its side walls, the bit 146 will break out a large diameter hole at the bottom of a preexisting hole 112. The bit 146 is narrow in comparison to the diameter of the hole 112, less than one half of the width of the hole. This enables the bit to be inclined sufficiently to work on and chip away the sides of the hole at the hole bottom. An adapter 148 may be required where the bit 146 has an end tapered or otherwise unacceptable to the jaws of the chuck of the drill. Preferably, the hole is blown free of debris. Whether molded initially or subsequently enlarged. This undercutting of the hole bottom side walls permits the hardening agent described above to fill in below hole side walls that are above and radially inward of the enlarged hole portion. The formed in situ anchor that the hardening agent forms is virtually impossible to withdraw without destroying the concrete structure above. The hardness and strength of the hardening agents specifically mentioned above are such that fastening systems used with holes formed in this manner consistently exceeded all expectations in resisting pull out.

FIGS. 4a–4e, shows another method for forming a fastener system in which the holes to receive the threaded fastener shafts are formed during casting. In FIG. 4a, a concrete form 150 or a mold for a particular cast item supports one or more bolts 152 having a fixed head 154 and cut or rolled threads 155 on its shaft 156. Each bolt 152 has a diameter slightly larger than the threaded shaft of a fastener that will ultimately be used to secure an object to the structure being cast. The lower end of the bolt 152 has press fit thereon a wide bottomed polyethylene (or other suitable material) cup 158. The bolt also has been coated with a release agent, such as described above.

Figure 4D:
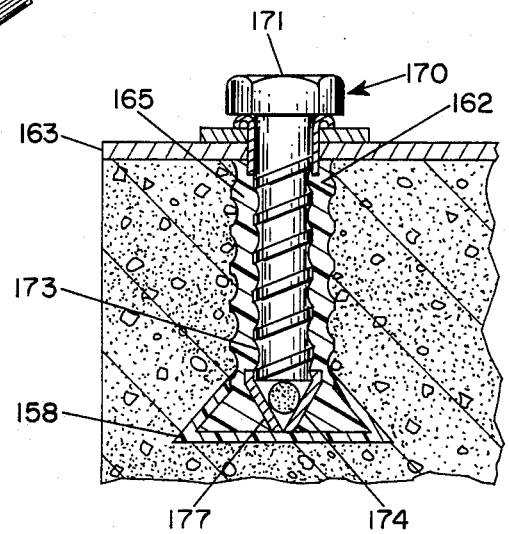
Figure 4B:
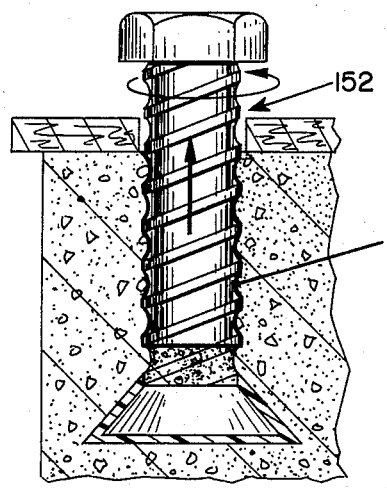

After the concrete has been poured into the form 50 and has hardened, the bolt 152 is backed out, leaving a hole 162 (FIG. 4b). The bolt leaves behind the cup 158. This serves as an enlarged bottom for the hole. A secured object 163 is correctly located. The hole 162 is filled with a hardening mixture 165 (FIG. 4c), such as the two-part securing agent described above, and a slightly smaller bolt 170 is inserted into the hole and embedded in the securing agent (FIG. 4d). Once the securing agent has hardened, the bolt 170 may be removed if it has been coated with release agent as described above. The bolt 170 has a fixed head 171. To permit further tightening, the end of a threaded shaft 173 of the bolt has an end cap 174, e.g., a press-fit polyethylene cup. This defines a void under the bolt. The cup 174 may contain a compressible form or pellet 177, of, e.g., neoprene, foam, or the like. The bolt 170 is inserted into the hardening agent filled hole until the cup 174 hits bottom. The form or pellet 177 prevents collapse of the cup.

Figure 4E:
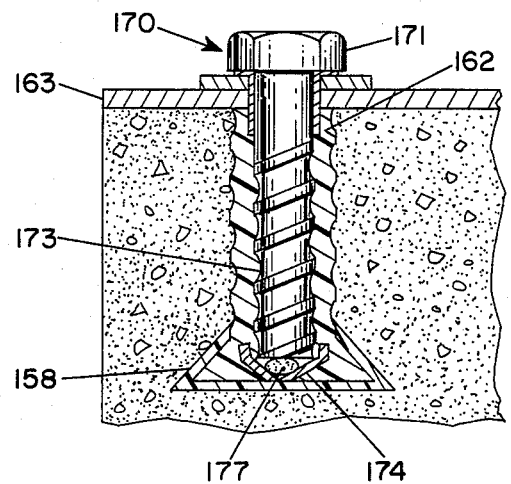
Figure 4C:
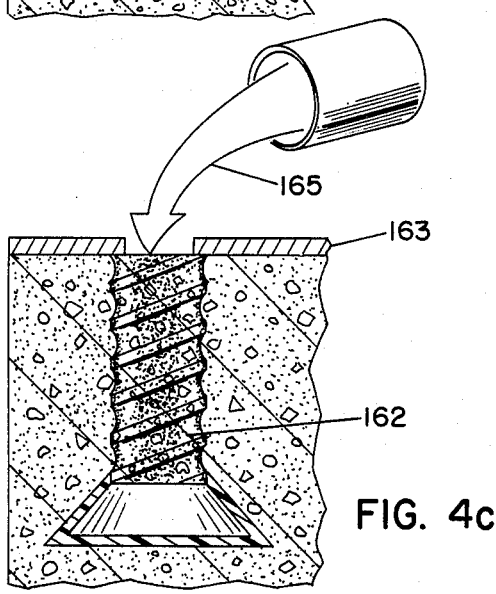

Referring to FIG. 4e, once the securing agent has hardened, the bolt may be turned and threaded deeper into the hole for further tightening. The void formed by the cup 174 below the bolt permits this. The cup 174 and the compressible pellet 177 collapse as the head 171 of the bolt tighten down to secure the object 163. In other words, the cup 174 has prevented the hardening agent from filling in under the bolt to prevent its being further threaded downwardly into the hole.

Figure 5:
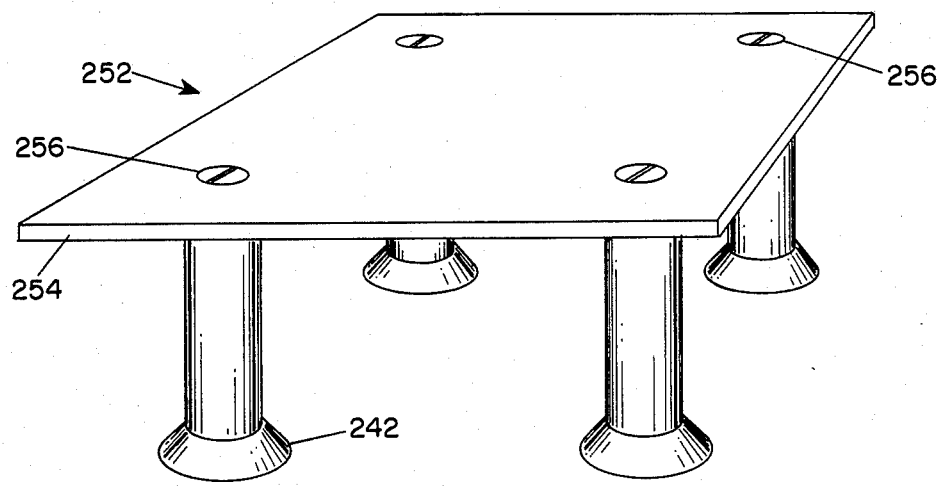
FIG. 5 is a perspective view of a mold part which is used for forming a number of enlarged bottom holes during casting of a concrete structure.
Figure 6A:
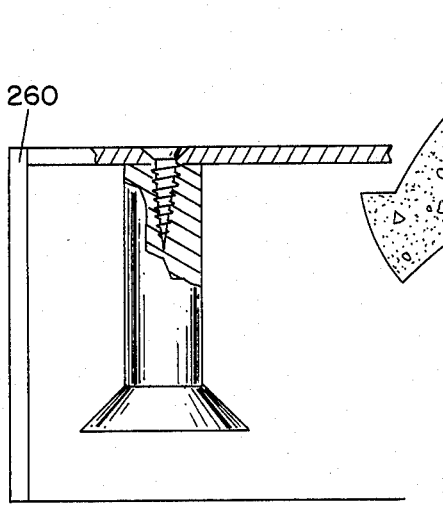
FIGS. 6a and 6b are fragmentary views, partly in section, of the mold part of FIG. 5 and shows the method of forming and preparing holes using the mold part.
Figure 6B:
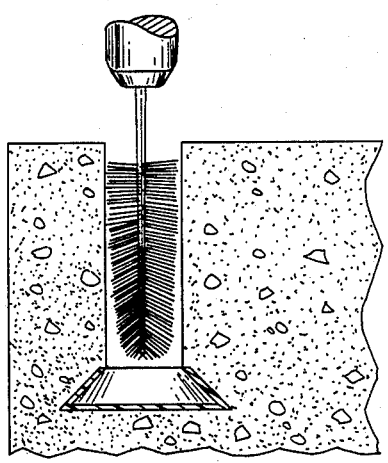

In FIG. 5 a mold part 252 forms a series of holes in the particular surface to which an object is to be secured. The holes are formed in a desired spaced relation relative to one another dictated by the holes in the particular object that will ultimately be secured. The mold part 252 includes a top plate 254 having a series of dowel-like rods 240, secured thereto, for example, by screws 256. The rods 240 have diameters greater than the threaded fastener shafts ultimately to be embedded in the holes formed thereby. Feet 242, of polyethylene or the like and similar to those described above, form enlarged diameter areas at the bottoms of the holes. When, as in FIG. 6a, the concrete has been poured into a form or mold 260, and has hardened about the rods 240, the mold part 252 is removed, leaving the desired number of enlarged bottom holes in their appropriate locations. The end caps 242 remain behind. The holes thus formed are thereafter filled with a hardening securing agent and have a threaded fastener shaft embedded therein as described above.

The rods 240 may also be a series of the bolts illustrated in FIGS. 4a–4e coated with a release agent, and having slightly larger diameters than the fastener shafts ultimately to be embedded. In that case, these bolts would need to be backed out of the holes. However, if smooth rods 240 are used to form the holes in a cast surface, it is preferable to roughen with a wire brush 6b the inner walls of the holes formed. This presents a roughened surface to the securing agent and provides a stronger bond of the securing agent to the inner wall of the hole.

Figure 7:
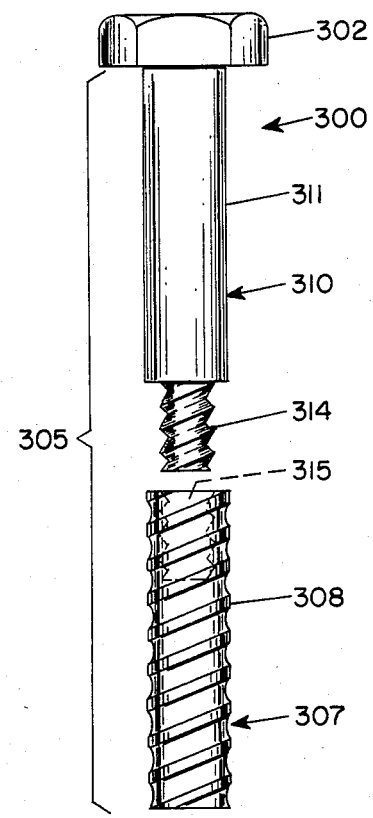
FIG. 7 is an elevational view of another arrangement of the fastener system of this invention.

An alternative arrangement of the parts of the fastener of this invention appears in FIG. 7. There, a bolt 300 has a fixed head 302, and a two part shaft 305. The lower half 307 of the shaft has a threaded exterior 308. The upper half 310 has a smooth exterior 311. This is coated with a release agent as described. A smaller diameter projection 314 at the bottom of the upper half 310 of the shaft 305 is threaded externally to be threaded into an internally threaded bore 315 in the upper end of the lower half 307 of the shaft. When inserted into a hole filled with securing agent as described above, the lower half's threaded exterior 308 provides a good grip to the hardened securing agent. The release agent coated upper part 311 of the shaft, however, easily withdraws from the hole by unthreading the projection 314 from the bore 307 and then sliding the upper portion out of the hole. This fastener may, if desired, also be fitted with a cup and pellet as in FIGS. 4d and 4e to permit further tightening by screwing of both shaft parts farther into the hole after the securing agent cures, in which case both parts should be release agent coated.

While preferred embodiments of the invention are described above, it will be appreciated by those skilled in the art that variations and modifications may be made thereto without departing from the spirit of the inventive concepts disclosed herein. All such variations and modifications are intended to fall within the scope of the appended claims.

I claim:
1. A fastener system for securing an object to a surface, comprising
   an elongate member having a threaded first end to be embedded in a hole in the surface, and an oppositely threaded external second end to extend out of said hole and receiving a nut only partially threaded therethrough with threads mating with threads of the oppositely threaded external end to couple said object to said elongate member,
   a securing agent means for pouring in said hole and to harden around said first end to form female threads cooperating with the male threads of said first end,
   a release agent applied to said first end to permit said elongate member to be turned in said hole after said hardening agent has hardened, and
   whereby turning the nut to thread the external end more deeply in the nut first tightens the nut on the secured object and then binds with the elongate member to turn the elongate member and back the elongate member out of the female threads of the hardened securing agent.

2. The fastener system according to claim 1, further comprising compressible means located in said nut between an interior surface at an end of the threads therein and said second end of said elongate member threaded therein.

3. A fastener system for securing an object to a surface comprising:
   an elongate member having a threaded first and to be embedded in a hole in the surface and a second external end having a fixed head thereon to effect turning of said elongate member in the hole,
   a securing agent means for pouring in the hole and to harden around said first end to form female threads cooperating with the male threads of said first end,
   a release agent applied to said first end to permit said elongate member to be turned in the hole after said securing agent has hardened, and
   means to effect tightening of said elongate member in the hole including means for preventing the filling in of the securing agent means immediately beyond the extremity of the first end, whereby the elongate member is threadable more deeply into the hole for tightening of the fastener system, said means for preventing the filling in of securing agent being secured to the first end of the elongate member and leaving a substantial portion of the threads on the member exposed for engagement with the hardening securing agent to form threads therein, wherby the threading of the elongate member more deeply in the hole is afforded by the mating threads of the elongate member and those formed in the securing agent, and is permitted by the means for preventing the filling in of the securing agent.

4. The fastener system according to claim 3 wherein the means for preventing the filling in of the securing agent is an end cap secured to the extremity of the first end and defining a void therein.

5. The fastener system according to claim 4, further comprising compressible means in said end cap.

6. A fastener system for securing an object to a surface comprising:
   an elongate member having a two part shaft for location in a hole in the surface,
   a first part of the shaft having a threaded exterior for engagement by formed in situ threads of a hardenable securing agent introduced into the hole, terminating at one end in an extremity to be located most deeply in the hole, and terminating at a second end in an end surface having a threaded bore therein,
   a second part of the shaft having a smooth exterior, terminating at an end having exterior means for securing an object against the surface, and terminating at another end in a threaded, reduced diameter section adapted to thread into the bore at said second end of the first part of the shaft, and
   a release agent coating the smooth exterior of the second part, whereby the second part is releasable from the first part and from the hardened securing agent securing the first part in place in the hole.

7. The fastener system of claim 6 wherein the release agent coats only surfaces of the second part.

8. A method of making a fastener system for securing an object to a surface, comprising the steps of
   forming in the surface a hole with an enlarged bottom,
   filling the hole with a hardening securing agent, inserting into the hole an elongate member having threads on at least a portion of the elongate member embedded in the hole,
   after hardening of the securing agent, tightening down an enlarged exterior part of the fastener system,
   the elongate member having a threaded external end and a reversely threaded interior end, the method further including the steps of providing a nut as the enlarged exterior part, the nut having only partly therethrough interior threads matching the external threads of the elongate member, introducing a compressible insert in the nut, wherein said step of tightening down comprises turning the nut and compressing the insert.

9. A method of making a fastener system for securing an object to a surface, comprising the steps of
   forming in the surface a hole with an enlarged bottom,
   filling the hole with a hardening securing agent, inserting into the hole an elongate member having threads on at least a portion of the elongate member embedded in the hole,
   after hardening of the securing agent, tightening down an enlarged exterior part of the fastener system,
   further comprising the step of excluding hardening securing agent from a location inward of and immediately adjacent the innermost tip of the elongate member, the step of tightening comprising threading the elongate member tip more deeply into the location free of securing agent after the agent has hardened.

10. The method according to claim 9, wherein the step of excluding hardening securing agent includes providing a cup at the end of the elongate member to be inserted in the hole, and
    inserting the elongate member and the cup into the hole with the hardening securing agent thereby defining a void at the end of the elongate member within the cup,
    wherein said step of tightening down comprises turning the elongate member to thread the elongate member into the void and thus more deeply into the hole.

11. The method according to claim 10, further comprising the steps of
    providing a collapsible insert within the cup in the void at the end of the elongate member,
    inserting the elongate member and the cup into the hole and forcing the member and cup down through the securing agent prior to its hardening until the cup hits the bottom of the hole without compressing the insert, and
    after the securing agent has hardened, tightening the elongate member in the hole to compress the insert.

12. The method according to claim 11, further including providing the elongate member with an enlarged head affixed thereto, said step of tightening being accomplished by turning the elongate member via the enlarged head.

13. A method of making a fastener system for securing an object to a surface, comprising the steps of
    forming in the surface a hole with an enlarged bottom,
    filling the hole with a hardening securing agent, inserting into the hole an elongate member having threads on at least a portion of the elongate member embedded in the hole,
    after hardening of the securing agent, tightening down an enlarged exterior part of the fastener system,
    the step of forming the hole further including forming an enlarged hole bottom by providing a mold part for use in molding the surface forming structure which comprises at least one elongate part with a laterally larger releasable element releasably secured at the end of the elongate part, and withdrawing the elongate part to leave behind the laterally larger releasable element to define the enlarged hole bottom.

14. The method according to claim 13 wherein the releaseable element is a hollow end cup and including the step of withdrawing the elongate part leaving behind the end cap.

15. The method according to claim 13, wherein the step of providing an elongate part includes providing an elongate part that is threaded, and coating the elongate part with a release agent.

16. The method according to claim 13, wherein the step of providing the elongate part includes providing an elongate part that has a smooth nonadherent exterior surface.

17. The method according to claim 16, further includes the step of roughening the interior surface of the hole after said smooth-surfaced elongate part is removed.

* * * * *

UNITED STATES PATENT AND TRADEMARK OFFICE
CERTIFICATE OF CORRECTION

PATENT NO. : 4,642,964
DATED : February 17, 1987
INVENTOR(S) : Roger C. Kellison It is certified that error appears in the above-identified patent and that said Letters Patent is hereby corrected as shown below:

Col. 6, line 10, should read --Whether molded initially or subsequently enlarged, this undercutting of the hole bottom side walls permits the hardening agent described above to fill in below hole side walls that are above and radially inward of the enlarged hole portion.--;

line 35, "50" should read --150--.

Col. 8, line 17, "and" should read --end--;

line 37, "wherby" should read --whereby--.

Col. 10, lines 49-50, "includes" should be --including--.

Signed and Sealed this

Sixth Day of October, 1987

Attest:

DONALD J. QUIGG

Attesting Officer

Commissioner of Patents and Trademarks